(12) United States Patent
Dittmer

(10) Patent No.: US 12,063,304 B1
(45) Date of Patent: Aug. 13, 2024

(54) LINE-POINT ZERO-KNOWLEDGE PROOF SYSTEM

(71) Applicant: Stealth Software Technologies, Inc., Los Angeles, CA (US)

(72) Inventor: Samuel Dittmer, Los Angeles, CA (US)

(73) Assignee: Stealth Software Technologies, Inc., Los Angeles, CA (US)

( * ) Notice: Subject to any disclaimer, the term of this patent is extended or adjusted under 35 U.S.C. 154(b) by 84 days.

(21) Appl. No.: 17/528,754

(22) Filed: Nov. 17, 2021

(51) Int. Cl.
| | | |
|---|---|---|
| H04L 29/06 | (2006.01) | |
| H04L 9/30 | (2006.01) | |
| H04L 9/32 | (2006.01) | |

(52) U.S. Cl.
CPC .......... *H04L 9/3218* (2013.01); *H04L 9/3093* (2013.01); *H04L 2209/46* (2013.01)

(58) Field of Classification Search
CPC .. H04L 9/3218; H04L 9/3093; H04L 2209/46
USPC ........................................................ 713/168
See application file for complete search history.

(56) References Cited

U.S. PATENT DOCUMENTS

| | | | | |
|---|---|---|---|---|
| 7,158,636 | B2* | 1/2007 | Ding | H04L 9/3093 380/37 |
| 11,362,829 | B2* | 6/2022 | Veeningen | H04L 9/085 |
| 2008/0013716 | A1* | 1/2008 | Ding | H04L 9/3093 380/30 |
| 2021/0334099 | A1* | 10/2021 | Araki | G06F 9/3001 |

OTHER PUBLICATIONS

Hazay, Scalable Multi-Party Private Set-Intersection, 2017, The Netherlands, Mar. 28-31, 2017, Proceeding, pp. 1-26 (Year: 2017).*
Goldwasser, "The Knowledge Complexity of Interactive Proof-Systems", 1985, ACM, pp. 291-303 (Year: 1985).*

* cited by examiner

*Primary Examiner* — Piotr Poltorak
*Assistant Examiner* — Gregory A Lane
(74) *Attorney, Agent, or Firm* — COOLEY LLP

(57) ABSTRACT

Non-transitory computer readable storage mediums have instructions executed by processors to access a first random data element at a first computing device. A first vector and a second vector are generated at a second computing device. A communication channel is utilized to execute a secure multiparty computation protocol between the first computing device and the second computing device. The first computing device alternately identifies a polynomial relations satisfied state and a polynomial relations unsatisfied state. A first selected instruction set is executed at the first computing device in response to the polynomial relations satisfied state. A second selected instruction set is executed at the first computing device in response to the polynomial relations unsatisfied state.

18 Claims, 3 Drawing Sheets

LINE-POINT ZERO-KNOWLEDGE PROOF SYSTEM

FIELD OF THE INVENTION

This invention relates generally to communications between computing devices. More specifically, this invention is directed toward establishing trustworthy, privacy-preserving, and secure statement-verification communications between computing devices utilizing a line-point zero-knowledge proof system.

BACKGROUND OF THE INVENTION

Zero-knowledge proof technologies enable two computing devices controlled by mutually untrusting parties each to verify the validity of an encoded statement by using private information held by the other, in a privacy-preserving manner that obscures the private information from the verifying computing device while ensuring the validity of the proof with high probability. For decades, zero-knowledge proofs were viewed primarily as a significant theoretical achievement in the fields of cryptography and computer science. In recent years, though, a significant amount of research and engineering has focused on designing and implementing concretely efficient zero-knowledge proof systems suitable for practical use, leading to applications in areas such as credential authentication, privacy-preserving auditing and compliance verification, and transaction authentication, particularly in cryptocurrency and other blockchain transaction networks.

However, efficiency, including computation, communication, and storage overhead, remains a significant barrier to widespread adoption of zero-knowledge proof systems, as existing technologies typically do not scale well to large verification tasks. To enable zero-knowledge verification of complex statements at scale and with high speed, it is accordingly desirable to design zero-knowledge proof systems with more efficient computation, communication, and storage overhead. It is against this background that a need arose to develop the techniques described herein.

SUMMARY OF THE INVENTION

Non-transitory computer readable storage mediums have instructions executed by processors to access a first random data element at a first computing device. A first vector and a second vector are generated at a second computing device. Entries of the first vector and the second vector collectively comprise non-public input wire values of a satisfying assignment of an arithmetic circuit and one or more second random data elements. A communication channel is utilized to execute a secure multiparty computation protocol between the first computing device and the second computing device. The first computing device inputs to the secure multiparty computation protocol the first random data element. The second computing device inputs to the secure multiparty computation protocol the first vector and the second vector. The secure multiparty computation protocol outputs to the first computing device a third vector equal to an evaluation utilizing the first random data element of an affine linear function determined by the first vector and the second vector. The first computing device alternately identifies a polynomial relations satisfied state and a polynomial relations unsatisfied state. A first selected instruction set is executed at the first computing device in response to the polynomial relations satisfied state. A second selected instruction set is executed at the first computing device in response to the polynomial relations unsatisfied state.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

Disclosed are techniques to provide efficient, privacy-preserving verification by a first computing device of statements of arithmetic circuit satisfiability using private information held by a second computing device, by utilizing a secure multiparty computation protocol that outputs to the first computing device the output of an affine linear function applied to a random data element, where the affine linear function is generated by the second computing device utilizing its private information.

The disclosed techniques improve network security and data privacy, by enabling the first computing device to verify statements without learning the second computing device's private information, while simultaneously ensuring with high probability that the privacy-preserving proof provided by the second computing device is valid, thereby frustrating network attacks attempting to pass off fraudulent or corrupted information. Moreover, the disclosed techniques improve the function of each of the two computing devices by enabling them to execute such privacy-preserving verification tasks with low computation, communication, and storage overhead relative to non-privacy-preserving verification.

Figure 1:
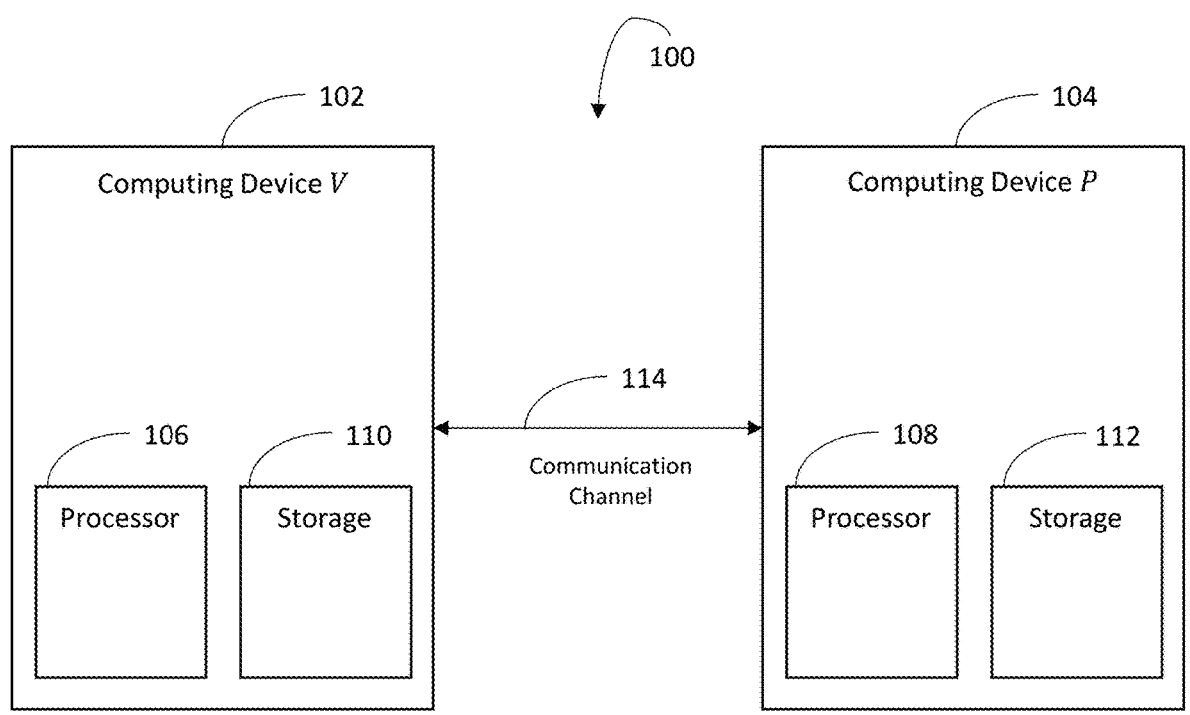
FIG. 1 illustrates a system for two computing devices storing data elements to perform computations on data elements and to transmit messages over a communication channel in order to jointly execute secure protocols, in accordance with an embodiment of the invention.

FIG. 1 illustrates a system 100 for two computing devices storing data elements to jointly execute statement-verification protocols, in which one computing device verifies the validity of a statement using private information held by the other computing device, with minimal information leakage to the verifying computing device. The system 100 includes a communication channel 114 connecting two computing devices 102 and 104. To assist in explanation, the computing devices 102 and 104 will sometimes be referred to as the "verifier" and "prover" devices respectively in subsequent descriptions, to emphasize their respective roles in executing protocols according to embodiments of the invention. The communication channel 114 may represent a network, such as a packet-switched network (such as the Internet) or a circuit-switched network, or any other communication channel over which electronic data may be transmitted. Each computing device 102 and 104 includes storage or memory 110 and 112 and a processor 106 and 108. The memory 110 and 112 for each computing device 102 and 104 each comprise one or more forms of electronic data storage or combinations thereof, including hard disk storage, solid-state drive storage, random access memory (RAM), or other forms of computer-readable electronic data storage. The data storage 110 and 112 may each reside in one computing device or may be distributed across multiple computing devices. The processors 106 and 108 for each computing device 102 and 104 each comprise one or more computer processors, which may reside in one computing device or may be distributed across multiple connected computing devices. The storage 110 and 112 for each computing device 102 and 104 each store a set of executable programs that may be used by the processors 106 and 108, respectively, to execute process steps described for embodiments of the present invention. In particular, each memory 110 and 112 stores executable programs that may be used by the processors 106 and 108 to execute secure multiparty computation protocols, arithmetic operations on data elements and vectors, and/or evaluation of hash functions. The properties of such secure multiparty computation protocols, arithmetic operations, and hash functions will be described in greater detail below.

In embodiments of the invention, each of the computing devices 102 and 104 may comprise a distributed system of multiple connected computing devices. The two computing devices 102 and 104 may also reside in separate computing devices or groups of computing devices connected by the communication channel 114, or they may both reside in a single larger computing device containing the communication channel 114.

In embodiments of the present invention, each computing device 102 and 104 will store one or more data elements in the storage 110 and 112. Data elements represent values that admit arithmetic operations of addition and multiplication. In subsequent descriptions of particular embodiments of the invention, data elements will be considered to represent values in a finite field IF. However, in other embodiments of the invention data elements may represent values in rings or any other mathematical structures that admit operations of addition and multiplication, and it is not assumed that all data elements in a given embodiment of the invention represent values in the same field, ring, or other mathematical structure. The storage 110 and 112 stores executable programs that may be used by the processors 106 and 108 to generate random data elements; unless otherwise specified, a random data element is sampled according to the uniform distribution on the field, ring, or other mathematical structure containing the value represented by the data element. The term "random," as used in the context of the present invention, includes data elements generated through the use of pseudorandom number generators or other deterministic algorithms used to generate sequences of numbers whose properties approximate those of truly random numbers. The present invention is non-limiting with respect to the data types, data structures, or bit representations under which such data elements may be stored in memory according to an embodiment of the invention. Unless specified, subsequent descriptions of data elements according to embodiments of the invention will suppress the distinction between a data element and the value it represents. In certain embodiments of the invention, bit representations of individual data elements may be stored in the memory 110 and 112 and/or transmitted over the communication channel 114 in a streaming fashion, without requiring the entire bit representation to be stored simultaneously in memory and/or transmitted contiguously.

In certain embodiments of the present invention, either or both of the computing devices 102 and 104 will also store one or more vectors, which are ordered lists of data elements. The data elements in such a vector will be referred to as the "entries" of the vector. Vectors admit arithmetic operations of addition and scalar multiplication. In subsequent descriptions of embodiments of the invention, the "length" or "dimension" of such a vector is the number of entries of the vector. The present invention is non-limiting with respect to the data types, data structures, or bit representations under which such vectors may be stored in memory according to an embodiment of the invention. In certain embodiments of the invention, vectors may be generated or computed by the processors 106 and 108, stored in the memory 110 and 112, and/or transmitted over the communication channel 114 in a streaming fashion, without requiring all of the data element entries of an individual vector to be generated or computed contiguously or simultaneously, stored simultaneously in memory, and/or transmitted contiguously.

Figure 2:
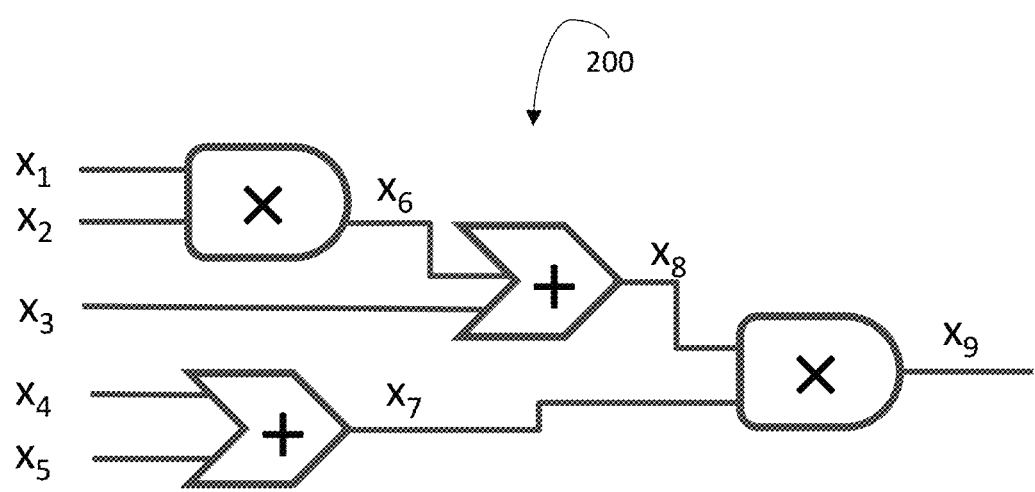
FIG. 2 is a circuit diagram of one example of an arithmetic circuit whose satisfiability can be verified by a first computing device using private information held by a second computing device, in a privacy-preserving manner, in accordance with an embodiment of the invention.

FIG. 2 is a circuit diagram of a particular arithmetic circuit 200 that will be used as an example in subsequent descriptions of protocols executed by the computing devices 102 and 104 according to particular embodiments of the invention, in order to assist in understanding. One goal of embodiments of the invention is to provide efficient implementations of proof systems for arithmetic circuit satisfiability, as will be explained further below. The arithmetic circuit 200 is not intended to be limiting and is presented only as one example of an arithmetic circuit to which embodiments of the invention may be applied.

Consistent with terminology standard in the art, descriptions of a given arithmetic circuit in subsequent descriptions of embodiments of the invention will refer to addition gates, multiplication gates, and wires of the arithmetic circuit; wires will typically be referenced by the values (which are represented by data elements in embodiments of the invention) they carry, which will be referred to as "wire values." Wires that are not output wires of any addition gate or multiplication gate will be referred to as "input wires" of the arithmetic circuit, wires that are not input wires of any addition gate or multiplication gate will be referred to as "output wires" of the arithmetic circuit, and all other wires will be referred to as "intermediate wires" of the arithmetic circuit. It should be appreciated from the previous sentence that the notions of input wires and output wires of the arithmetic circuit are distinct from the notions of input wires and output wires of a given addition or multiplication gate; an input or output wire of a gate may be an intermediate wire. In particular, as used in the context of embodiments of the invention, the term "multiplication gate input wire value" refers to the value of a wire that inputs to a multiplication gate in the arithmetic circuit; such a wire may also be an input wire of the arithmetic circuit, or it may be an intermediate wire. References to wires or gates "previous" to or "preceding" a given wire or gate in the arithmetic circuit should be interpreted with respect to paths through the circuit beginning at input wires and ending at output wires, under the standard identification of the circuit with a directed acyclic graph.

By way of illustration, for the arithmetic circuit 200, the input wire values are $x_1$, $x_2$, $x_3$, $x_4$, and $x_5$; the sole output wire value is $x_9$; and the intermediate wire values are $x_6$, $x_7$, and $x_8$. The addition and multiplication gates of the arithmetic circuit 200 are denoted in FIG. 2 by + and x, respectively. Accordingly, the values $x_1$, $x_2$, $x_7$, and $x_8$ are multiplication gate input wire values. It will be appreciated that, under a standard identification of addition and multiplication gates with the arithmetic operations of addition and multiplication, respectively, an arithmetic circuit with k output wires represents a system of k polynomial equations in the input and output wire values. By way of example, the arithmetic circuit 200 represents the single polynomial equation $(x_1 x_2 + x_3)(x_4 + x_5) = x_9$. In subsequent descriptions of embodiments of the invention, references to a given arithmetic circuit "over" a particular ring, field, or other mathematical structure should be interpreted to imply that the wire values of the arithmetic circuit are elements of that ring, field, or other mathematical structure.

In the context of embodiments of the invention, for any given arithmetic circuit it is assumed that each of the output wires is assigned a fixed constant value; additionally some of the input wires may be assigned fixed constant values, while the remaining input wire values are interpreted as variables. Wires that are assigned fixed constant values will sometimes be referred to as "public" wires in subsequent descriptions of embodiments of the invention, while wires with variable values will sometimes be referred to as "non-public" or "variable" wires. As is standard in the art, such an arithmetic circuit will be described as "satisfiable" if the variable input wires can be assigned values that yield a solution of the system of polynomial equations represented by the arithmetic circuit; the resulting assignment of values to all wires, including intermediate wires, in such a satisfiable arithmetic circuit will be referred to as a "satisfying assignment" of the arithmetic circuit. It should be noted that the term "satisfying assignment" as used here and in subsequent descriptions of embodiments of the invention is sometimes referred to in the art instead as an "extended witness" for the satisfiability of the arithmetic circuit. It should further be noted that, in the context of embodiments of the invention, the phrase "non-public input wire values of a satisfying assignment of an arithmetic circuit" refers to values assigned, in a satisfying assignment, to non-public input wires of the arithmetic circuit as a whole; by contrast, the phrase "multiplication gate input wire values in the satisfying assignment of the arithmetic circuit" refers to values assigned, in the satisfying assignment, to multiplication gate input wires, which may be either intermediate wires or input wires of the arithmetic circuit as a whole. By way of example, for the arithmetic circuit 200 interpreted as an arithmetic circuit over the finite field $\mathbb{F}_{17}$ of integers modulo 17, if the output wire is assigned the constant value $x_9 = 0$ and the input wire $x_2$ is assigned the constant value 2, the arithmetic circuit 200 represents the polynomial equation $(2x_1 + x_3)(x_4 + x_5) = 0$
$x_1 = 1, x_2 = 2, x_3 = 7, x_4 = 1, x_5 = 16, x_6 = 2, x_7 = 0, x_8 = 9, x_9 = 0$, and is a satisfying assignment of the circuit 200 (with elements of $\mathbb{F}_{17}$ represented as integers between 0 and 16 and the operations of addition and multiplication interpreted modulo 17).

It should be noted that, although the example arithmetic circuit 200 has been constructed with only four addition and multiplication gates for the sake of simplicity and clarity, arithmetic circuits to which embodiments of the invention will typically be applied will frequently be significantly larger, in many cases having millions, billions, or trillions of gates.

It is well known that the arithmetic circuit satisfiability problem, that is, the problem of deciding whether or not a given arithmetic circuit has a satisfying assignment, is an NP-complete decision problem; that is, in the terminology of computational complexity theory, any decision problem for which a solution can be verified in polynomial time can be efficiently reduced to an instance of the arithmetic circuit satisfiability problem. Accordingly, embodiments of the present invention, which provide privacy-preserving verification of statements of arithmetic circuit satisfiability, can be combined with such reductions to provide privacy-preserving verification of a broad class of statements that do not explicitly reference arithmetic circuit satisfiability. It should further be noted that, in particular, it is known that satisfying assignments of Boolean circuits can be verified (without privacy-preservation considerations) in polynomial time; in other words, the problem of Boolean circuit satisfiability lies in the complexity class NP. Accordingly, certain embodiments of the invention can provide privacy-preserving verification of statements of Boolean circuit satisfiability.

Figure 3:
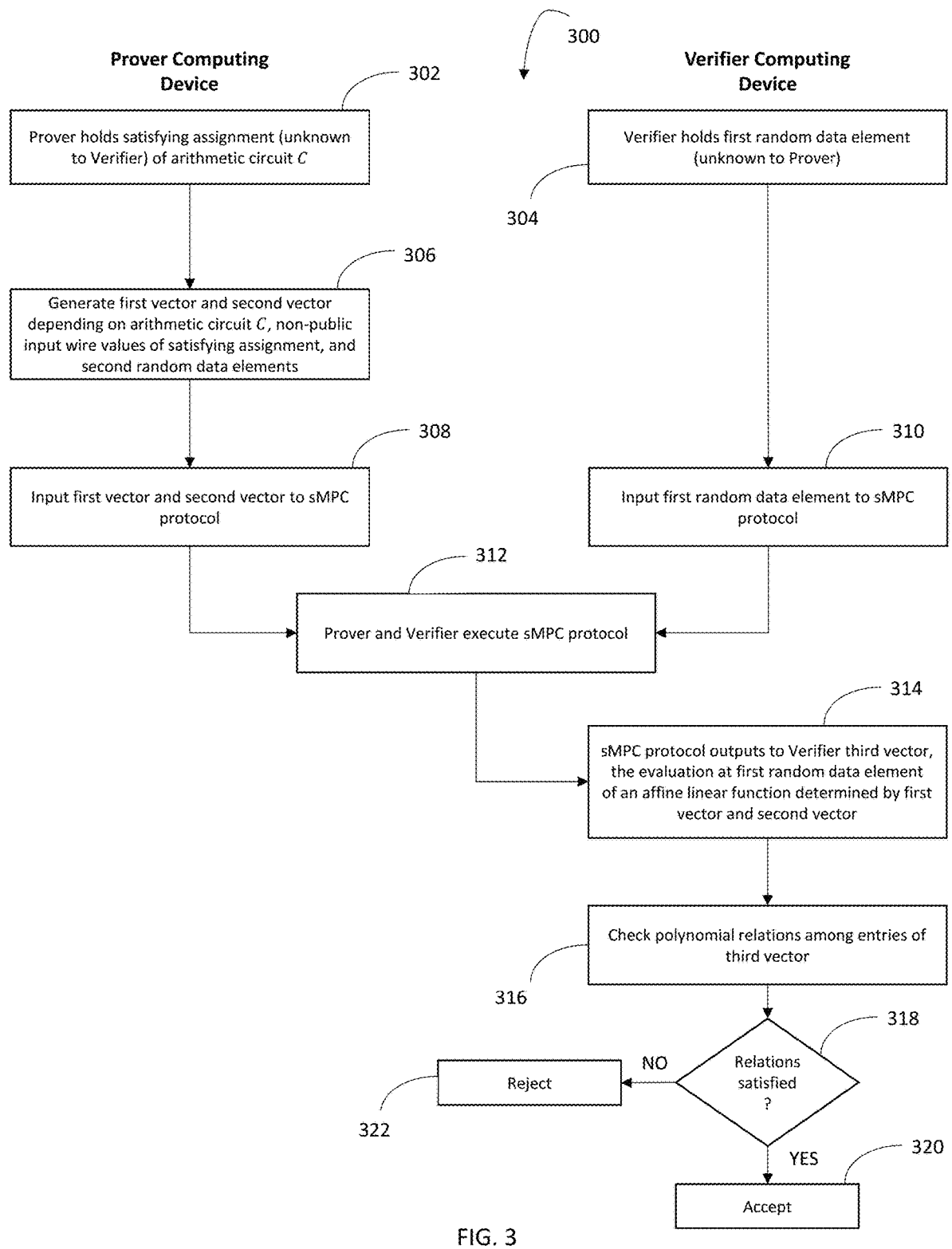
FIG. 3 is a diagram of a protocol for a first computing device to verify the satisfiability of an arithmetic circuit using private information held by a second computing device, while maintaining the privacy of the private information and ensuring the validity of the verification with high probability, in accordance with an embodiment of the invention.

FIG. 3 is a protocol according to an embodiment of the invention, for a first computing device 102 to verify a statement of satisfiability for a given arithmetic circuit, where a second computing device 104 has access to a satisfying assignment of the arithmetic circuit. In subsequent descriptions of FIG. 3, the first computing device 102 will sometimes be referred to as the "verifier" computing device, and the second computing device 104 will sometimes be referred to as the "prover" computing device. The verification protocol of FIG. 3 is privacy-preserving, in the sense that it does not reveal to the first computing device 102 any meaningful information about the values of non-public wires in the satisfying assignment. More precisely, the protocol of FIG. 3 yields a proof system with the properties of completeness, soundness, and zero-knowledge with respect to a security model, as those terms are commonly understood in the art. Informally, completeness means that the verifier computing device 102 will always accept the satisfiability of the arithmetic circuit whenever the prover computing device 104 correctly follows the protocol; soundness means that, except with a small probability referred to as "soundness error," the verifier computing device 102 will reject the satisfiability of the arithmetic circuit whenever a "cheating" prover computing device 104, which does not actually have access to a satisfying assignment, deviates from the protocol; and zero-knowledge means that the verifier computing device 102 can efficiently simulate, through local computations, a message transcript that is "indistinguishable" from a transcript of messages that would be sent over the communication channel 114 during an execution of the protocol with an "honest" prover computing device 104. It should be noted that, as is commonly understood in the art, there are multiple variants (e.g., perfect, statistical, or computational) of completeness, soundness, and zero-knowledge, as well as various security models in which these properties may be established. The present invention is non-limiting with respect to these variants and security models.

In an embodiment of the invention, at block 302 the prover computing device 104 holds a satisfying assignment of a given arithmetic circuit, which will be referred to as C; a goal of the protocol of FIG. 3 is for the verifier computing device 102 to verify an assertion that C is satisfiable, with completeness, soundness, and zero-knowledge. In an embodiment of the invention, it is assumed that the verifier computing device 102 has access to the arithmetic circuit structure of C, as well as to the public wire values of C. It should be noted that, by default, descriptions of the states, computations, and communications of the prover computing device 104 during the execution of the protocol of FIG. 3 assume that the prover computing device 104 is "honest"; that is, unless specific reference is made to a "cheating" prover, such descriptions assume that the prover computing device 104 actually has access to a satisfying assignment of the arithmetic circuit C. It should further be noted that the description of the prover computing device 104 as "holding" a satisfying assignment does not imply that all data elements representing wire values in a satisfying assignment must be stored simultaneously in the storage 112 of the prover computing device at any point in the protocol. In some embodiments of the invention, the prover computing device 104 may generate, access from another computing device, and/or store such data elements "on the fly" as they are required for computations during the execution of the protocol.

Moreover, in some embodiments of the invention, the prover computing device 104 may have direct access only to the input wire values of a satisfying assignment of C, and compute the values of intermediate and/or output wires using such input wire values as needed during the execution of the protocol.

By way of example, in an embodiment of the invention applied to the arithmetic circuit 200 of FIG. 2, the prover computing device 104 holds a satisfying assignment $x_j=a_1$, for $1 \le j \le 9$, of the arithmetic circuit 200. In particular such embodiments of the invention, the prover computing device 104 may have direct access only to the input wire values $a_1$, $a_2$, $a_3$, $a_4$, $a_5$ of that satisfying assignment; in such embodiments, the computing device 104 can compute the remaining wire values of the satisfying assignment according to the arithmetic circuit 200, namely as $a_6=a_1a_2$, $a_7=a_4+a_5$, $a_8=a_6+a_3=a_1a_2+a_3$, and $a_9=a_7a_8=(a_4+a_5)(a_1a_2+a_3)$.

In an embodiment of the invention, at block 304, the verifier computing device 102 holds a random data element, which will be referred to as $\alpha$. The present invention is not limiting with respect to the manner in which random data elements are generated. In particular, throughout the subsequent description of FIG. 3, in embodiments of the invention, random data elements accessed, stored, and/or communicated by either the verifier computing device 102 or the prover computing device 104 may be generated locally at the respective computing device, or they may be generated through a trusted setup or other protocol between the computing devices 102 and 104 for generating correlated randomness, either before or during execution of the protocol of FIG. 3.

In an embodiment of the invention, at block 306, the prover computing device 104 generates a first vector, which will be referred to as a, and a second vector, which will be referred to as b. The entries of the vectors a and b collectively include the non-public input wire values of the satisfying assignment held by the prover computing device 104 at block 302, as well as random data elements. In certain embodiments of the invention, the entries of the vectors a and b collectively further include data elements that are equal to polynomial combinations of wire values in the satisfying assignment and/or random data elements. In certain embodiments of the invention, the entries of the vectors a and b collectively include data elements that are polynomial combinations of data elements of the following types: random data elements, multiplication gate input wire values in the satisfying assignment of C, and outputs of one or more hash functions applied to data elements that are themselves polynomial combinations of random data elements and multiplication gate input wire values in the satisfying assignment of C. In certain embodiments of the invention, the hash function used may be generated from a block cipher or a stream cipher. In preferred embodiments of the invention, the hash function used is a cryptographic hash function. In certain embodiments of the invention, each of the computing devices 102 and 104 may compute hashes of data elements by applying another hash function with larger domain to vectors of data elements. Data elements of types described in this paragraph may be allocated as entries of a or as entries of b in various ways, according to various embodiments of the invention.

In an embodiment of the invention, at blocks 308 and 310 the prover computing device 104 inputs the vectors a and b and the verifier computing device 102 inputs the random data element a to a secure multiparty computation (sMPC) protocol, which the computing devices 102 and 104 jointly execute at block 312. At block 314, the secure multiparty computation protocol outputs to the verifier computing device 102 the evaluation $v(\alpha)$ at the random data element a of an affine linear function $v(t)$ determined by the vectors a and b. Given that the constructions of the vectors a and b at block 306 may be interchanged according to different embodiments of the invention, in subsequent descriptions of embodiments of the invention it is assumed for simplicity that the affine linear function $v(t)$ is given by $v(t)=at+b$. Accordingly, at block 314 the secure multiparty computation protocol outputs to the verifier computing device 102 the vector $v(\alpha)=a\alpha+b$.

In the context of the present invention, the term "secure multiparty computation protocol" is used in a sense commonly understood in the art. In particular, the secure multiparty computation protocol of blocks 308-314 comprises local computations at either or both of the computing devices 102 and 104 and transmission of messages using the communication channel 114; in certain embodiments of the invention, the secure multiparty computation protocol may include an "offline" or setup phase executed before any of the other steps of the protocol depicted in FIG. 3. More precisely, in the "ideal/real model" known in the art, also known as the "simulation paradigm," the secure multiparty computation protocol of blocks 308-314 securely realizes the ideal functionality that takes as inputs (a,b) from the prover computing device 104 and $\alpha$ from the verifier computing device 102, and outputs to the verifier computing device 102 the vector $v(\alpha)=a\alpha+b$. It will be understood by one skilled in the art that various secure multiparty computation protocols realizing this ideal functionality may rely on differing security assumptions and may provide differing security guarantees; the present invention is non-limiting with respect to such security assumptions and guarantees. Informally, the secure multiparty computation protocol of blocks 308-314 outputs $a\alpha+b$ to the verifier computing device 102 without revealing to the prover computing device 104 any meaningful information about the data element $\alpha$, and without revealing to the verifier computing device 102 any meaningful information about either the vector a or the vector b. However, it should be noted that the secure multiparty computation protocol output $a\alpha+b$ itself may reveal information about the vectors a and b depending on the procedure for constructing a and b according to a given embodiment of the invention; for example, if the protocol of FIG. 3 requires at block 306 that a particular entry of the vector a have value 0, then the output $a\alpha+b$ at block 314 will reveal the corresponding entry of b to the verifier computing device 102. In certain embodiments of the invention, the secure multiparty computation protocol of 308-314 may comprise a vector oblivious linear evaluation (VOLE) protocol or a random vector oblivious linear evaluation (rVOLE) protocol, as will be described further below.

In an embodiment of the invention, at block 316 the verifier computing device 102 alternately identifies either a polynomial relations satisfied state or a polynomial relations unsatisfied state, by checking a set of one or more polynomial relations among the random data element a held at block 302 and entries of the vector $v(\alpha)=a\alpha+b$ output at block 314. In an embodiment of the invention in which the entries of the vectors a and b collectively include polynomial combinations of hash function outputs and other data elements as described above with respect to block 306, at block 316 the verifier computing device 102 checks a set of one or more polynomial relations among such hash function outputs, the random data element $\alpha$, and the entries of the vector $v(\alpha)$. The computing device 102 identifies a polynomial relations satisfied state if all of the checked polynomial relations are satisfied, and identifies a polynomial relations unsatisfied state otherwise. The set of polynomial relations is constructed as part of the specification of the protocol of FIG. 3 in such a manner as to provide completeness and soundness properties as previously described. Informally, if the prover computing device 104 has adhered to the protocol steps at blocks 302, 306, 308, and 312, all of the polynomial relations will be satisfied, whereas if the prover computing device 104 has "cheated," in the sense that it did not hold a genuine satisfying assignment of the arithmetic circuit C at block 302, then with high probability at least one of the polynomial relations will not be satisfied.

By way of example, in this paragraph protocol specifications for blocks 306-316 of FIG. 3 will be described for a particular embodiment of the invention applied to the arithmetic circuit 200 of FIG. 2, viewed as an arithmetic circuit over a finite field $\mathbb{F}$. In such an embodiment of the invention, at block 306 the prover computing device 104 generates the vectors a and b as follows: The prover computing device accesses or computes $a_j$ as the wire values in a satisfying assignment $x_j=a_j$, for $1\leq j\leq 9$, of the arithmetic circuit 200. The prover computing device generates or accesses random data elements $b_j$ for $1\leq j\leq 9$ and constructs the vectors a and b as $$a = (a_1, a_2, a_3, a_4, a_5, a_6, a_7, a_8, a_9, a_1b_2 + b_2a_1 - b_6, a_7b_8 + a_8b_7 - b_9),$$

$$b = (b_1, b_2, b_3, b_4, b_5, b_6, b_7, b_8, b_9, b_1b_2, b_7b_8).$$

It should be noted that the last two entries of a are quadratic polynomial combinations of multiplication gate input wire values in the satisfying assignment and random data elements. At blocks 308-314, the prover and verifier computing devices 104 and 102 execute a secure multiparty computation protocol that outputs to the verifier computing device 102 the vector $$v(\alpha) = (a_1\alpha + b_1, \ldots, a_9\alpha + b_9,$$

$$(a_1b_2 + b_2a_1 - b_6)\alpha + b_1b_2, (a_7b_8 + a_8b_7 - b_9)\alpha + b_7b_8) = (v_1, \ldots, v_{11}),$$

where $\alpha$ is the random data element accessed at block 304 and input to the secure multiparty computation protocol at block 310 by the verifier computing device 102. It will be appreciated by one skilled in the art that, due to the uniform randomness of the data elements $b_j$ for $1\leq j\leq 9$, the entries of $v(\alpha)$ reveal no information to the verifier computing device 102 about the any of the non-public wire values $a_j$ of the satisfying assignment of the arithmetic circuit 200, guaranteeing the zero-knowledge property in the sense described above. At block 316, the verifier computing device 102 checks the following set of polynomial relations among a and the entries of v:

$$v_4 + v_5 = v_7$$

$$v_3 + v_6 = v_8$$

$$v_1v_2 - \alpha v_6 = v_{10}$$

$$v_7v_8 - \alpha v_9 = v_{11}$$

It will be appreciated that these polynomial relations yield the property of completeness in the sense previously described: if $x_j=a_j$, $1\leq j\leq 9$, is a satisfying assignment of the arithmetic circuit 200, so that $a_4+a_5=a_7$, $a_3+a_6=a_8$, $a_1a_2=a_6$, and $a_7a_8=a_9$, then all four of the polynomial relations are satisfied. It will further be appreciated that these polynomial relations yield the property of soundness in the sense previously described, with soundness error at most $2/|\mathbb{F}|$ (where $|\mathbb{F}|$ denotes the size of the finite field $\mathbb{F}$), as follows: If the prover computing device 104 has "cheated," so that $x_j=a_j$, $1\leq j\leq 9$, is not in fact a satisfying assignment of the arithmetic circuit 200, then at least one of the equations $a_4+a_5=a_7$, $a_3+a_6=a_8$, $a_1a_2=a_6$, and $a_7a_8=a_9$ must fail to be true. If an equation of the form $a_i+a_j=a_k$ fails, then the corresponding polynomial relation $v_i+v_j=v_k$ yields $$(a_i+a_j-a_k)\alpha+(b_i+b_j-b_k)=0,$$

where the left-hand side is a polynomial of degree 1 in $\alpha$. Regardless of how the cheating prover computing device 104 deviates from the protocol specifications described in this paragraph, that is, regardless of the values assigned to $a_i$, $a_j$, $a_k$, $b_i$, $b_j$, and $b_k$ by the computing device 104 at block 306, the polynomial relation $v_i+v_j=v_k$ can be satisfied only if the random data element a is a root of this degree-1 polynomial, which occurs with probability $1/|\mathbb{F}|$. Similarly, if an equation of the form $a_ia_j=a_k$ fails, then the corresponding polynomial relation can be satisfied only if the random data element a is a root of a degree-2 polynomial in a of the form $$(a_ia_j-a_k)\alpha^2+b\alpha+c=0$$

for some b and c, which occurs with probability at most $2/|\mathbb{F}|$. It should be appreciated that the protocol specifications described in this paragraph for an embodiment of the invention applied to the example arithmetic circuit 200 can be adapted to any arithmetic circuit, by requiring the prover computing device 104 at block 306 to include all wire values $a_j$ of a satisfying assignment as entries of the vector a; a corresponding number of random data elements $b_j$ as entries of the vector b; and for each multiplication gate in the arithmetic circuit, with $a_i$ and $a_j$ the input wire values to the multiplication gate in the satisfying assignment, a data element of the form $a_ib_j+b_ia_j-b_k$ and a data element of the form $b_ib_j$ as corresponding entries of a and b, respectively. The verifier computing device 102 can then be required at block 316 to check for each addition gate a polynomial relation of the form $v_i+v_j=v_k$ and for each multiplication gate a polynomial relation of the form $v_iv_j-\alpha v_k=v_l$, where the index l corresponds to the entry of a with value $a_ib_j+b_ia_j-b_k$. It should further be appreciated that, in other embodiments of the invention, the vectors a and b can be shortened by eliminating entries corresponding to public wire values, and additional optimizations can be achieved in light of the verifier computing device 102's access to the structure of the arithmetic circuit for which satisfiability is verified. Finally, it should be appreciated that the specific polynomial combinations of data elements used to generate the vectors a and b at block 306 and the specific polynomial relations checked at block 316 as presented in this paragraph are intended only as illustrative examples and are not intended to be limiting.

In an embodiment of the invention, at blocks 318-322 the verifier computing device 102 either accepts or rejects the statement that the arithmetic circuit C is satisfiable, in response to identification of either a polynomial relations satisfied state or a polynomial relations unsatisfied state, respectively, at block 316. The verifier computing device 102 then executes a first selected instruction set if the statement is accepted and executes a second selected instruction set if the statement is rejected. In certain embodiments of the invention, the first selected instruction set may comprise instructions to authenticate a network transaction, and the second selection set may comprise instructions to reject the network transaction.

The invention is more fully appreciated in connection with the following discussion of various embodiments thereof. The following discussion considers particular embodiments of the invention mainly in the setting of designated-verifier, non-interactive zero-knowledge ("dv-NIZK") proof systems. In such embodiments, the secure multiparty computation protocol executed at block 312 of FIG. 3 includes an interactive setup phase that determines a secret verification key held by the verifier computing device 102; this setup is "reusable," in the sense that subsequent applications of the protocol of FIG. 3 to different arithmetic circuits, but between the same verifier computing device 102 and prover computing device 104, can be accomplished without requiring any communication from the verifier computing device 102 to the prover computing device 104 over the communication channel 114. Moreover, the following discussion will primarily consider particular embodiments of the invention in a more restrictive setting, sometimes referred to in the art as "preprocessing NIZK," in which the secure multiparty computation protocol of block 312 includes an "offline," interactive preprocessing protocol between the prover computing device 104 and the verifier computing device 102, which is executed before any input arithmetic circuit whose satisfiability is to be verified has been determined, and which results in both computing devices 104 and 102 receiving correlated secret randomness that can be used in multiple subsequent applications of the protocol of FIG. 3 to verify the satisfiability of multiple arithmetic circuits.

One goal of the present invention is to improve the efficiency of zero-knowledge proof systems. There are multiple metrics considered in the art for measuring efficiency of proof systems, and much of the research in the art to date has focused on improving succinctness, which refers both to the proof length and the running time of the verifier computing device during protocol execution. Succinctness is a highly relevant efficiency metric in the setting of protocols for publicly verifiable proofs, which are generated once by a prover computing device and subsequently verified many times by different verifier computing devices. However, in the setting of a proof that is verified once by a designated verifier computing device, other complexity metrics, including the prover computing device's running time and storage requirements, can become the main sources of performance inefficiency. State-of-the-art succinct proof systems, such as zk-SNARKs based on pairings or interactive oracle proofs (IOPs), typically incur large concrete prover computation costs when scaled to large verification tasks. Moreover, they typically have large storage requirements and incur running times for the prover computing device many times larger than those of evaluating verification circuits in the clear. By contrast, it is known that certain non-succinct or semi-succinct proof systems scale better to large verification tasks.

Accordingly, a goal of the present invention is to maximize the advantages of non-succinct zero-knowledge proof systems, focusing mainly on minimizing the prover computing device's computational overhead during a zero-knowledge statement-verification protocol. Such an approach is particularly advantageous in settings where the prover computing device 104 and the verifier computing device 102 are connected by a communication channel 114 in a fast local network. An extreme example of such a setting is that in which the computing devices 102 and 104 are directly physically connected. The prover computing device's computational and storage overhead are also particularly relevant efficiency metrics in settings where a potentially large number of proofs may be generated and stored "offline" at the prover computing device 104 and only verified by a verifier computing device 102 at some indeterminate later time, or potentially not at all. Additionally, in settings where the prover computing device 104 comprises a distributed system of multiple computing devices among which a satisfying assignment of an arithmetic circuit is secret-shared, the computational overhead of the prover computing device in distributed generation of a zero-knowledge proof of satisfiability of the arithmetic circuit is likely to be among the primary sources of inefficiency. Accordingly, it is desirable to achieve zero-knowledge proof systems for arithmetic circuit satisfiability with constant computational overhead, that is, with total computational cost— and therefore, in particular, the prover computing device's computational cost—at most a constant times the computational cost of verifying arithmetic circuit satisfiability in the clear (that is, without the privacy-preservation guarantees of the zero-knowledge property).

One approach to achieving zero-knowledge proof systems with constant computational overhead relies on known protocols referred to in the art as "oblivious linear evaluation" (or "OLE") and/or vector variants thereof referred to as "vector oblivious linear evaluation" (or "VOLE"). A VOLE protocol between a sender computing device and a receiver computing device typically takes as input from the sender computing device a pair of vectors (a,b), takes as input from the receiver computing device a data element $\alpha$, and outputs to the receiver in a privacy-preserving manner the evaluation $v(\alpha)=a\alpha+b$ at $a$ of the affine linear function $v(t)=at+b$. Accordingly, known VOLE protocols of this variety, in which the sender inputs a pair of vectors and the receiver inputs a data element, can be seen as particular examples of a secure multiparty computation protocol as depicted at blocks 308-314 of FIG. 3, with the prover computing device acting as the sender and the verifier computing device acting as the receiver. One advantage of certain embodiments of the present invention, as will be described further below, is allowing for a non-interactive zero-knowledge ("NIZK") proof to be reduced to reduced to a single instance of VOLE, thereby entailing reduced computation and communication overhead.

To provide context for subsequent descriptions of specific embodiments of the invention and their security and efficiency properties, below is described a "line-point zero-knowledge" ("LPZK") proof system according to particular embodiments of the invention. Below, the standard "big O" notation is used to assist in description of security and efficiency properties of embodiments of the invention; a variable quantity A is said to be O(B) for some other variable quantity B, where A and B vary depending on a common parameter, if there exists some fixed constant D such that A is less than or equal to DB for all values of the underlying parameter. It should further be noted that the below definition of LPZK refers to arithmetic circuits over a given finite field IF; such an arithmetic circuit C having k variable input wires and k' output wires is naturally identified with a polynomial function from $\mathbb{F}^k$ to $\mathbb{F}^{k'}$. In the following definition, a "witness" $w \in \mathbb{F}^k$ for the satisfiability of such an arithmetic circuit C is a vector whose entries are the variable input wire values of a satisfying assignment of C. Additionally, to facilitate rigorous interpretation of security and efficiency properties, the following definition and subsequent descriptions of particular embodiments of the invention are presented with respect to an arithmetic model in which probabilistic polynomial time algorithms can sample a uniformly random element from F at unit computational cost and perform field operations at unit computational cost.

Definition 1 (LPZK): A line-point zero-knowledge (LPZK) proof system for arithmetic circuit satisfiability, according to particular embodiments of the invention, is a pair of algorithms (Prove, Verify) with the following syntax: Prove($\mathbb{F}$,C,w) is a probabilistic polynomial time algorithm that, given an arithmetic circuit C: $\mathbb{F}^k - \mathbb{F}^{k'}$ and a witness $w \in \mathbb{F}^k$, outputs a pair of vectors a, $b \in \mathbb{F}^n$ that specify an affine linear function v(t)=at +b, for some dimension n determined by C. Verify($\mathbb{F}$, V, $\alpha$, v($\alpha$)) is a polynomial time algorithm that, given an evaluation v($\alpha$) of the affine linear function v(t) at an element $\alpha \in F$, outputs either accept or reject. According to certain preferred embodiments of the invention, the algorithms Prove and Verify have the following properties of completeness, soundness, and zero-knowledge; according to other preferred embodiments, the soundness property is modified to a computational, rather than statistical, soundness property:

Completeness: For any arithmetic circuit C: $\mathbb{F}^k \to \mathbb{F}^{k'}$ and witness $w \in \mathbb{F}^k$ such that C(w)=0, and for any fixed $a \in \mathbb{F}$, the algorithm Verify($\mathbb{F}$,C,$\alpha$,v($\alpha$)) outputs accept with probability 1, where the probability is computed with respect to the distribution of the output affine linear function v(t) of the probabilistic polynomial time algorithm Prove($\mathbb{F}$,C,w).

Reusable $\varepsilon$-Soundness: For every arithmetic circuit C: $\mathbb{F}^k \to \mathbb{F}^{k'}$ such that C(w)$\neq$0 for all $w \in \mathbb{F}^k$, and for every adversarially chosen affine linear function v*(t)=a*t+b* from F to $\mathbb{F}^n$ with dimension n determined by C as above, the algorithm Verify($\mathbb{F}$,C,$\alpha$,v*($\alpha$)) outputs accept with probability at most $\varepsilon$, where the probability is computed with respect to the choice of a as a uniformly random element of $\mathbb{F}$ and $\varepsilon > 0$ is a chosen soundness error parameter. Moreover, for every $\mathbb{F}$,C,v*(t), the probability of Verify accepting, again with respect to the uniform choice of $\alpha$, either is equal to 1 or is at most $\varepsilon$. Unless otherwise specified, in subsequent descriptions of embodiments of the invention it is assumed that $\varepsilon \leq O(1/|\mathbb{F}|)$.

Perfect Zero-knowledge: There exists a probabilistic polynomial time simulator Sim such that, for any arithmetic circuit C: $\mathbb{F}^k \to \mathbb{F}^{k'}$, any witness $w \in \mathbb{F}^k$ such that C(w)=0, and any $\alpha \in \mathbb{F}$, the output of Sim($\mathbb{F}$,C,$\alpha$) is distributed identically to v($\alpha$), where v(t) is the affine linear function produced by the probabilistic polynomial time algorithm Prove($\mathbb{F}$,C,w).

It should be appreciated from Definition 1 that in certain embodiments of the invention, for an LPZK pair of algorithms (Prove, Verify), instructions for executing Prove at the prover computing device 104 and instructions for executing Verify at the verifier computing device 102 can be linked via a secure multiparty computation protocol as depicted in blocks 308-314 of FIG. 3 to provide privacy-preserving verification of arithmetic circuit satisfiability (or, using other commonly accepted terminology, a zero-knowledge proof system for arithmetic circuit satisfiability). In the context of an embodiment of the invention as depicted in FIG. 3, at block 306 of FIG. 3, the prover computing device 104 executes the algorithm Prove($\mathbb{F}$,C,w) for a witness w of the satisfiability of an arithmetic circuit C as held at block 302, and blocks 316-322 comprise the verifier computing device 102's execution of the algorithm Verify($\mathbb{F}$,C,$\alpha$,v($\alpha$)), for a the random data element accessed by the computing device 102 at block 304 and v($\alpha$) the vector output by the secure multiparty computation protocol at block 314. As noted in the preceding description of FIG. 3, it will be understood by one skilled in the art that there are numerous known secure multiparty computation protocols that can be executed at blocks 308-314, and the present invention is not limiting with respect to such secure multiparty computation protocols. Below are discussed approaches to designing such secure multiparty computation protocols that rely on vector oblivious linear evaluation, which may be used in particular embodiments of the invention.

It is known that a VOLE protocol, as discussed above, with sender inputs (a, b) and receiver input a can easily be reduced to an instance of "random vector oblivious linear evaluation" ("random VOLE" or "rVOLE"). In the context of embodiments of the present invention, an rVOLE instance is a secure protocol that outputs to the prover computing device 104 a pair of random vectors a' and b' specifying an affine linear function v'(t) and outputs to the verifier computing device 102 a random data element a and the evaluation v'($\alpha$) of the affine linear function at $\alpha$. Given such an rVOLE instance, for arbitrary vectors a and b (of dimension equal to that of the vectors in the rVOLE instance) held by the prover computing device, the prover computing device 104 and the verifier computing device 102 can execute a VOLE protocol with prover input a and b and verifier input a as follows: Because the vectors a' and b' are uniformly random, the prover computing device 104 can transmit to the verifier computing device 102 the vectors a-a' and b-b', from which the verifier computing device can derive no information about the vectors a and b. The verifier computing device 102 can then compute (a-a')$\alpha$+(b-b')+v' ($\alpha$)=a$\alpha$+b, the desired VOLE output. Such an approach is attractive for communication efficiency; beyond the communication overhead of an interactive pre-processing protocol required to set up the rVOLE instance, the VOLE protocol can be executed with communication of only 2n data elements over the communication channel 114, from the prover computing device 104 to the verifier computing device 102, where n denotes the dimension of the vectors a and b. Techniques are known for generating long, pseudo-random instances of rVOLE with communication complexity sublinear in the vector length; a sufficiently long such rVOLE instance can be used to obtain multiple rVOLE setups for multiple VOLE protocol executions. For concrete efficiency, currently known VOLE implementations relying on pseudorandom correlation generators are particularly attractive; a pseudorandom correlation generator for VOLE enables "silent" generation of long random rVOLE correlations through local expansion of a pair of short, correlated seeds. This local expansion can be accomplished in near-linear or even linear time, and may be carried out during an offline phase before the prover computing device 104's input vectors a and b to any VOLE instance are determined. The secure generation of correlated seeds for a pseudorandom correlation generator can also be accomplished through a concretely efficient, low-communication protocol.

Subsequent discussions of security and efficiency properties of NIZK proof systems for arithmetic circuit satisfiability according to particular embodiments of the invention will accordingly consider the setting of the "rVOLE-hybrid model," which assumes a trusted setup, as part of the secure multiparty computation protocol executed at block 312 of FIG. 3, that outputs to the prover computing device 104 a pair of random vectors a' and b' and outputs to the verifier computing device 102 the random data element a (as accessed at block 304) and the vector a'·α+b'. In this setting, the dimension of the vectors a' and b' will be referred to as the "rVOLE length." When using a VOLE obtained from such a trusted rVOLE setup as all or part of the secure multiparty computation protocol that links the Prove and Verify algorithms of an LPZK proof system as described above, there are two optimizations that can reduce communication overhead: First, with a, b as in Definition 1, when the Prove algorithm requires that an entry of a or b be chosen uniformly at random, it can be selected to be the corresponding entry of a' or b', respectively, and the corresponding entry of (a-a') or (b-b'), respectively, need not be communicated to the verifier computing device. Second, when the Prove algorithm requires an entry of a to be equal to zero, as noted above in the context of FIG. 3, use of VOLE or any other secure multiparty computation protocol does not prevent the corresponding entry of b from being revealed to the verifier computing device 102. Accordingly, such entries of b can be transmitted directly from the computing device 104 to the computing device 102 in the clear, and the corresponding entries of a, being required to be zero, need not be transmitted to the computing device 102; this allows for a reduction of the rVOLE length by 1, and a reduction of communication overhead by one data element. In view of these optimizations, subsequent descriptions of the efficiency properties of particular embodiments of the invention will refer to "(n, n', n")-LPZK." Here n is the dimension of the vectors a and b as in Definition 1; n' is the number of entries of a and b, collectively, to which neither of the two above-described optimizations apply; and n" is the number of entries of a to which the second above-described optimization does apply. In particular, it will be appreciated that a VOLE protocol linking the Prove and Verify algorithms for an LPZK system as in Definition 1 can be realized using a trusted setup in the rVOLE-hybrid model with rVOLE length n-n", and using such a VOLE protocol to link the Prove and Verify algorithms yields a NIZK protocol requiring communication overhead of only n'+n" data elements transmitted from the prover computing device 104 to the verifier computing device 102.

It should be appreciated from the above discussion that in certain embodiments of the invention, the secure multiparty computation protocol of blocks 308-314 FIG. 3 may comprise direct application of a known VOLE protocol; in certain other embodiments of the invention, the secure multiparty computation protocol of blocks 308-314 may comprise a VOLE protocol resulting from an rVOLE setup that also outputs to the verifier computing device 102 the random data element accessed at block 304, and the rVOLE length may be less than the dimension of the vectors generated by the prover computing device 104 at block 306 and input to the overall VOLE protocol at block 308. It will be understood by one skilled in the art that in particular embodiments of the invention, a secure multiparty computation protocol as depicted at blocks 308-314 that comprises a VOLE protocol, whether or not achieved via an rVOLE instance generated through a setup protocol, may use the VOLE protocol in a "non-black-box" manner and may comprise additional protocols, for example to verify securely that the prover computing device's input at block 308 satisfies prescribed conditions.

Below is described a protocol according to particular embodiments of the invention for privacy-preserving verification of arithmetic circuit satisfiability, referred to as "information-theoretic LPZK," for a circuit C. As part of the protocol specification, a fixed batching parameter t is selected; it is assumed that the batching parameter t does not exceed the number of multiplication gates in the arithmetic circuit C. To assist in describing the protocol, it will be understood by one skilled in the art that any arithmetic circuit C over a field IF with k variable input wires, k' output wires, m multiplication gates, and arbitrarily many addition gates can be represented efficiently as an ordered triple $(x, Q_C, R_C)$, with x a vector in $\mathbb{F}^{k+k'+4m+1}$, $Q_C$ a collection of m quadratic polynomials over $\mathbb{F}$, and $R_C$ a set of linear relations over $\mathbb{F}$. More specifically, the vector $x = (a_0, a_1, \ldots, a_{k+k'+4m})$ represents wire values as follows: The entry $a_0$ has value 1 and, as will be appreciated from the subsequent description, can be used to express subsequent entries of x as outputs of addition gates to which a constant input wire of the arithmetic circuit C is an input. The entries $a_1, \ldots, a_k$ correspond to the k variable input wires of C, and the entries $a_{k+4m+1}, \ldots, a_{k+4m+k'}$ correspond to the k' output wires of C. For $1 \le i \le m$, the entries $a_{k+4i-3}$ and $a_{k+4i-2}$ correspond to the input wires of a given multiplication gate, and the entry $a_{k+4i-1}$ corresponds to the output wire of that multiplication gate; the entries $a_{k+4i}$ are not necessary to provide a complete encoding of the circuit but will be used in the subsequent description of the information-theoretic LPZK protocol. In keeping with the aforementioned correspondence of entries of x to input and output wires of multiplication gates, the collection $Q_C$ of quadratic polynomials encodes the polynomial relationship between the input and output wires of each multiplication gate; specifically, for $1 \le i \le m$, the ith polynomial in $Q_C$ is defined as $q_i(x) = a_{k+4i-1} - a_{k+4i-3} a_{k+4i-2}$. The set $R_C$ of linear relations represents the structure of addition gates in the arithmetic circuit C; it will be appreciated that any intermediate wire that is an input wire to a multiplication gate of C can be expressed as a linear combination of preceding wires. Accordingly, with r·x denoting the standard dot product, $R_C$ is encoded as a set of 2m+k' vectors $r_i$, which can be determined from the gate structure of C, corresponding to the relations $r_{2i-j} \cdot x = a_{k+4i-2-j}$ for $j \in \{0,1\}$ and $1 \le k \le m$, where the only nonzero entries of $r_{2i-j}$ appear at indices less than or equal to k+4i-4, and $r_{2m+i} \cdot x = 0$ for $1 \le i \le k'$. (It should be noted that, for the sake of simplicity, it is assumed in the subsequent descriptions of particular embodiments of the invention that all k' output wires of the circuit C are constant and equal to zero; it is known that an arbitrary arithmetic circuit C can efficiently be converted to such an arithmetic circuit whose satisfiability is equivalent to that of C. Similarly, it is assumed without loss of generality that each of the vectors $r_{2m+i}$ for $1 \le i \le k'$ has at least one nonzero entry, and that the only nonzero entries of each $r_{2m+i}$ appear at indices less than or equal to $k+4m+1$.) It is further required that each $r_j$ have an entry of zero at each index $k+4i$ for $1 \le j \le 2m+k'$ and $1 \le i \le m$; that is, the relations in $R_C$ cannot depend on the entries $a_{k+4i}$ that do not directly correspond to wires of C. It will be appreciated from the foregoing description that, given a vector $w=(a_1, \ldots, a_k)$ of assignments to the variable input wires of C, an assignment of the remaining entries of x, other than $a_{k+4i}$ for $1 \le i \le m$, can be generated using the relations in $R_C$ and the equations $q_i(x)=0$ for $1 \le i \le m$; the vector w is a valid witness of the satisfiability of C if and only if the entries $a_{k+4m+1}, \ldots, a_{k+4m+k'}$ corresponding to the output wires are all equal to zero.

In an embodiment of the invention, the prover computing device 104 holding such a witness vector w at block 302 of FIG. 3 constructs at block 306 a pair of vectors a and b as follows: The prover computing device sets $a_0=1$ and $b_0=0$. The next k entries of a are set to the entries of the witness vector w, and the corresponding elements of b are set to be uniformly random data elements. Using the relations in $R_C$, for $1 \le i \le m$ (corresponding to the ith multiplication gate in C) and for $j \in \{0,1\}$, the prover computing device sets:

$$a_{k+4i-2-j} = r_{2i-j} \cdot a$$

$$b_{k+4i-2-j} = r_{2i-j} \cdot b$$

$$a_{k+4i-1} = a_{k+4i-3} a_{k+4i-2}$$

$$a_{k+4i} = a_{k+4i-3} b_{k+4i-2} + a_{k+4i-2} b_{k+4i-3} - b_{k+4i-1},$$

and sets $b_{k+4i-1}$ and $b_{k+4i}$ to be uniformly random data elements. For $1 \le i \le k'$ the prover computing device sets $a_{k+4m+i}=0$ and $b_{k+4m+i}=r_{2m+i} \cdot b$. Having thus formed the first $k+k'+4m+1$ entries of each of the vectors a and b, the prover computing device computes for each $1 \le i \le m$ a data element $c_i$ with value $b_{k+4i-3} b_{k+4i-2} - b_{k+4i}$ if that value is nonzero and sets $c_i=1$ otherwise. For t the fixed batching parameter selected as part of the protocol specification, as described above, for each $1 \le i \le \lceil m/t \rceil$ the prover computing device sets $a_{k+k'+4m+i}=0$ and $$b_{k+k'+4m+i} = \prod_{j=t(i-1)+1}^{ti} c_j.$$

This completes the prover computing device's construction of the vectors a and b at block 306 according to a particular embodiment of the invention.

In a particular embodiment of the invention, at block 308 of FIG. 3 the prover computing device 104 inputs the vectors a and b to a secure multiparty computation protocol, and at block 310 the verifier computing device 102 inputs a random data element a to the secure multiparty computation protocol, which the computing devices 102 and 104 execute at block 312 as follows: The prover computing device 104 first constructs from a and b a pair of shortened vectors â and b̂ by deleting from each of a and b the zeroth entry and the entries with index $k+4i-2-j$, for $1 \le i \le m$ and $j \in \{0,1\}$. The prover computing device 104 and the verifier computing device 102 then execute a VOLE protocol in which the prover computing device acts as sender with inputs â and b̂, and the verifier computing device acts as receiver with input α; the VOLE protocol securely outputs to the verifier computing device 102 the vector $\hat{v}=\hat{a}\alpha+\hat{b}$. The verifier computing device 102 then computes from $\hat{v}$ a vector v with entries $v_j$ by reindexing to match the indexing of a and b, setting $v_0=1$, and computing $$v_{k+4i-2-j} \cdot r_{2i-j} \cdot v$$

for $1 \le i \le m$ and $j \in \{0,1\}$. The vector v constitutes the output of the secure multiparty computation protocol to the verifier computing device 102 at block 314; it will be appreciated that, under a correct execution of the secure multiparty computation at block 312, the vector v will be equal to $a\alpha+b$.

In a particular embodiment of the invention, at block 316 of FIG. 3 the verifier computing device 102 checks the following polynomial relations among a and the entries of the vector v: For each $1 \le i \le k'$, the verifier computing device checks whether the linear relation $r_{2m+i} \cdot v=v_{k+4m+i}$ is satisfied. For each $1 \le i \le m$ the verifier computing device computes a data element $x_i$ with value $v_{k+4i-3}v_{k+4i-2}-\alpha v_{k+4i-1}-v_{k+4i}$ if that value is nonzero and sets $x_i=1$ otherwise; the verifier then checks for each $1 \le i \le \lceil m/t \rceil$ the polynomial relation $$\prod_{j=t(i-1)+1}^{ti} x_j = v_{k+k'+4m+i},$$

At blocks 318-322, the verifier computing device 102 returns accept if all of the checked polynomial relations are satisfied (that is, in response to the polynomial relations satisfied state) and returns reject otherwise (that is, in response to the polynomial relations unsatisfied state).

It can be proven that the above-described protocol for information-theoretic LPZK yields a line-point zero-knowledge proof system according to Definition 1, with soundness error parameter $\varepsilon \le 2t/|\mathbb{F}|$. More specifically, viewing the shortened vectors â and b̂ as the output of the Prove algorithm of Definition 1, the protocol yields an (n,n',n")-LPZK proof system with size parameters $n=k+k'+(2+1/t)m$, $n'=k+2m$, and $n"=m/t+k'$. Moreover, assuming that the computational cost of addition in the field $\mathbb{F}$ is negligible compared to the cost of multiplication, the prover computing device 104's computational overhead, in an embodiment of the invention applying the above-described information-theoretic LPZK protocol to obtain a NIZK protocol using a trusted rVOLE setup, is less than 4 times the cost of verifying the satisfiability of C by evaluating it on the witness w in the clear, and the computational overhead of the verifier computing device 102 is less than 5 times the cost of verification in the clear. Additionally, if the rVOLE instances from the trusted setup are precomputed, or if computed rVOLE instances can be unpacked in a streaming fashion, the NIZK protocol according to such an embodiment of the invention does not require any of the vectors a, b, and v to be either computed or stored in its entirety; instead, the entries of those vectors corresponding to each multiplication gate in the arithmetic circuit C can be computed on the fly, rendering the protocol storage-efficient and amenable to streaming. In particular, in preferred such embodiments of the invention, computations such as $a_{k+4i-2-j}=r_{2i-j} \cdot a$ appearing in the above protocol description should be interpreted as hard-coded evaluation of addition and scalar multiplication gates, rather than an implementation storing the vector $r_{2i-j}$ in memory and computing a dot product. In fact, in such embodiments, beyond the storage costs of the VOLE and the storage that would be required for verification in the clear, the only data element that the verifier computing device 102 needs to store at any time in the protocol execution is a single field element holding the product of the $x_j$ terms in the current polynomial relation checking batch.

Below is described a protocol according to particular embodiments of the invention for privacy-preserving verification of arithmetic circuit satisfiability making use of hash functions, referred to as "ROM-LPZK," for a circuit C over a field IF; in preferred such embodiments, the hash functions used are cryptographic hash functions. The terminology "ROM-LPZK" refers to the fact that provable security properties of the NIZK proof system given by the protocol are formulated in the random oracle model. As in the above description of the protocol for information-theoretic LPZK, it is assumed in the subsequent description that the arithmetic circuit C has k variable input wires, k' output wires, m multiplication gates, and arbitrarily many addition gates. As part of the protocol specification, a fixed dimension parameter r is selected. The subsequent description of the ROM-LPZK protocol makes use of a hash function H: $\mathbb{F}^m \to \mathbb{F}^{mr}$ that can be applied to m-dimensional vectors of data elements. To assist in explanation, the output of H will be treated in subsequent descriptions as an r×m matrix with entries in F. It should be noted that the presentation of inputs to the hash function H as vectors and outputs of H as matrices is for notational convenience. In an embodiment of the invention, such a hash function H may be applied to a collection of data elements, rather than to an explicitly presented vector, by considering a vector whose entries are those data elements. Moreover, in an embodiment of the invention, although the output of H is presented as a single matrix, the individual data element entries of such a matrix may also be viewed as outputs of H, generated by applying H to a collection of data elements.

In an embodiment of the invention, at block 306 of FIG. 3 the prover computing device 104 generates a pair of vectors a and b. For $0 \le i \le k+k'+4m$, the prover computing device sets the entries $a_i$ of a and the entries $b_i$ of b identically as in the above-described protocol for information-theoretic LPZK, except that, for $1 \le j \le m$, each entry $a_{k+4j}$ is chosen uniformly at random from $\mathbb{F}$, and each entry $b_{k+4j}$ is set equal to $b_{k+4j-1}$. The next r entries $a_i$ and $b_i$ of a and b, for $k+k'+4m+1 \le i \le k+k'+4m+r$, are chosen uniformly at random from $\mathbb{F}$, where r is the fixed dimension parameter selected as part of the protocol specification. The final m+2r entries of a are all set to zero, and the remaining m+2r entries of b will be described below. It should be noted that, as in the above discussion of optimizations for NIZK protocols obtained from LPZK protocols using a trusted rVOLE setup, these remaining m+2r entries of b can be transmitted by the prover computing device 104 to the verifier computing device 102 in the clear as part of the secure multiparty computation protocol executed at block 312, without requiring any VOLE overhead. The prover computing device 104 generates vectors y and z in $\mathbb{F}^m$ with entries $y_i = b_{k+4i-1} - a_{k+4i-3}b_{k+4i-2} - a_{k+4i-2} b_{k+4i-3}$ and $z_i = -b_{k+4i-3}b_{k+4i-2}$ respectively, for $1 \le i \le m$. The prover computing device generates a vector u with entries $u_i = a_{k+4i-1} - a_{k+4i}$ for $1 \le i \le m$. The prover computing device then computes two r-dimensional vectors y and z as $y = (a_{k+k'+4m+1}, \ldots, a_{k+k'+4m+r})^T + H(u)y^T$ and $z = (b_{k+k'+4m+1}, \ldots, b_{k+k'+4m+r})^T + H(u)z^T$, where the superscript T denotes the transpose of a vector viewed as a 1×r matrix. The prover computing device sets the remaining 2m+r entries of b as follows: for $1 \le i \le m$, $b_{k+k'+4m+r+i} = u_i$;

$a_{k+4i-1} - a_{k+4i}$; for $1 \le j \le r$, $b_{k+k'+5m+r+j}$ is set equal to the jth entry of the vector y; and for $1 \le j \le r$, $b_{k+k'+5m+2r+j}$ is set equal to the jth entry of the vector z. This completes the prover computing device's construction of the vectors a and b at block 306 according to a particular embodiment of the invention for ROM-LPZK.

In a particular embodiment of the invention, at block 308 of FIG. 3 the prover computing device 104 inputs the vectors a and b to a secure multiparty computation protocol, and at block 310 the verifier computing device 102 inputs a random data element a to the secure multiparty computation protocol, which the computing devices 102 and 104 execute at block 312 as follows: The prover computing device 104 first constructs from a and b a pair of shortened vectors â and b̂ with entries $\hat{a}_i$ and $\hat{b}_i$, respectively. Specifically, for $1 \le i \le k$, the prover computing device sets $\hat{a}_i = a_i$ and $\hat{b}_i = b_i$; for $1 \le i \le m$, the prover computing device sets $\hat{a}_{k+i} = a_{k+4i}$ and $\hat{b}_{k+i} = b_{k+4i}$; and for $1 \le i \le r$, the prover computing device sets $\hat{a}_{k+m+i} = a_{k+k'+4m+i}$ and $\hat{b}_{k+m+i} = b_{k+k'+4m+i}$. The prover computing device sets the final k'+m+2r entries of â to zero. With the vectors $r_j$ encoding the set of linear relations $R_C$ for the arithmetic circuit C as described above in the context of the information-theoretic LPZK protocol, for $1 \le i \le k'$ the prover computing device sets $\hat{b}_{k+m+r+i} = r_{2m+i} \cdot b$; for $1 \le i \le m$ the prover computing device sets $\hat{b}_{k+k'+m+r+i} = u_i = a_{k+4i-1} - a_{k+4i}$; and for $1 \le i \le 2r$ the prover computing device sets $\hat{b}_{k+k'+2m+r+i} = b_{k+k'+5m+r+i}$. The prover computing device 104 and the verifier computing device 102 then execute a VOLE protocol in which the prover computing device acts as sender with inputs â and b̂, and the verifier computing device acts as receiver with input α; the VOLE protocol outputs to the verifier computing device 102 the vector $\hat{v} = \hat{a}\alpha + \hat{b}$ in a privacy-preserving manner. The verifier computing device 102 then computes from v a vector $v = a\alpha + b$ with entries $v_j$, by reconstructing $v_{k+4i-1}$ as $v_{k+4i-1} = \hat{v}_{k+4i} + \alpha \hat{v}_{k+k'+m+r+i}$ for $1 \le i \le m$, and reconstructing the other missing values as described above for the information-theoretic LPZK protocol. The vector v constitutes the output of the secure multiparty computation protocol to the verifier computing device 102 at block 314.

In a particular embodiment of the invention, at block 316 of FIG. 3 the verifier computing device 102 generates an m-dimensional vector s with entries $s_i = v_{k+4i-1}\alpha - v_{k+4i-3}v_{k+4i-2}$ for $1 \le i \le m$. The verifier computing device then computes three r-dimensional vectors s, $y_\alpha$, and $z_\alpha$ as follows:

$$s = (v_{k+k'+4m+1}, \ldots, v_{k+k'+4m+r})^T + H(u)s^T,$$

$$y_\alpha = (v_{k+k'+5m+r+1}, \ldots, v_{k+k'+5m+2r}), \text{ and}$$

$$z_\alpha = (v_{k+k'+5m+2r+1}, \ldots, v_{k+k'+5m+3r}),$$

and checks the vector equation $y_\alpha \alpha + z_\alpha = s$. It should be noted that, in order to compute s, the verifier computing device can access the vector u as $u = (v_{k+k'+4m+r+1}, \ldots, v_{k+k'+4m+r+m})$. It will be appreciated that the vector equation $y_\alpha \alpha + z_\alpha = s$ is equivalent to a set of polynomial relations among α, entries of the vector v, and the hash function outputs used by the prover computing device 104 to generate the vectors a and b at block 306. If any of these polynomial relations is unsatisfied, at block 318 the verifier computing device 102 identifies a polynomial relations unsatisfied state and returns reject at block 322. Otherwise, the verifier computing device continues at block 316 to check the linear polynomial relations $r_{2m+i} \cdot v = v_{k+4m+i}$ for $1 \leq i \leq k'$. If any of these linear polynomial relations is unsatisfied, the verifier computing device identifies at block 318 a polynomial relations unsatisfied state and returns reject at block 322; otherwise, the verifier computing device identifies at block 318 a polynomial relations satisfied state and returns accept at block 320.

It can be proven that the above-described protocol for ROM-LPZK, when viewed in the random oracle model with the hash function H modeled by a random oracle, yields a line-point zero-knowledge proof system according to Definition 1, with computational rather than statistical soundness. More specifically, viewing the shortened vectors a and b as the output of the Prove algorithm of Definition 1, the protocol yields an (n, n', n'')-LPZK proof system with size parameters n=k+k'+m+2r, n'=k, and n''=k'+m+2r. For any potentially malicious prover computing device making l calls to the random oracle H, the soundness error parameter is at most $\varepsilon = (2/|\mathbb{F}|) + (l/|\mathbb{F}'|)$. In an embodiment of the invention applying the above-described ROM-LPZK protocol to obtain a NIZK protocol using a trusted rVOLE setup, the NIZK protocol excluding setup costs has communication overhead of k+k'+m+2r field elements transmitted over the communication channel 114, and total amortized computational overhead of 3+2r field multiplications per multiplication gate for the prover computing device 104, 3+r field multiplications per multiplication gate for the verifier computing device 102, and a single evaluation of the hash function H for each computing device. It should further be noted that, aside from the VOLE storage cost, the above-described ROM-LPZK protocol can be converted to a streaming protocol requiring only O(r) local storage cost beyond that which would be required for verification of circuit satisfiability in the clear.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

The invention claimed is:

1. Non-transitory computer readable storage mediums with instructions executed by processors to:
   access a first random data element at a first computing device;
   generate a first vector and a second vector at a second computing device, entries of the first vector and the second vector collectively comprising non-public input wire values of a satisfying assignment of an arithmetic circuit and one or more second random data elements;
   execute, utilizing a communication channel, a secure multiparty computation protocol between the first computing device and the second computing device, where the first computing device inputs to the secure multiparty computation protocol the first random data element, the second computing device inputs to the secure multiparty computation protocol the first vector and the second vector, and the secure multiparty computation protocol outputs to the first computing device a third vector equal to an evaluation utilizing the first random data element of an affine linear function determined by the first vector and the second vector;
   alternately identify at the first computing device a polynomial relations satisfied state and a polynomial relations unsatisfied state, where the foregoing operations establish a zero-knowledge proof that enables the first computing device and the second computing device controlled by mutually untrusting parties each to verify validity of an encoded statement in a privacy-preserving manner that obscures private information from a verifying computing device while ensuring the validity of the proof with high probability;
   execute a first selected instruction set at the first computing device in response to the polynomial relations satisfied state; and
   execute a second selected instruction set at the first computing device in response to the polynomial relations unsatisfied state.

2. The non-transitory computer readable storage mediums of claim 1 wherein the entries of the first vector and the second vector collectively further comprise one or more first polynomial combinations of one or more of the second random data elements and one or more first multiplication gate input wire values in the satisfying assignment of the arithmetic circuit.

3. The non-transitory computer readable storage mediums of claim 1 wherein the entries of the first vector and the second vector collectively further comprise one or more second polynomial combinations of one or more of the second random data elements, one or more second multiplication gate input wire values in the satisfying assignment of the arithmetic circuit, and one or more data elements generated by applying one or more hash functions to one or more third polynomial combinations of one or more of the second random data elements and one or more third multiplication gate input wire values in the satisfying assignment of the arithmetic circuit.

4. The non-transitory computer readable storage mediums of claim 1, wherein the instructions to execute, utilizing the communication channel, the secure multiparty computation protocol between the first computing device and the second computing device comprises instructions to execute a vector oblivious linear evaluation protocol between the first computing device and the second computing device.

5. The non-transitory computer readable storage mediums of claim 1, wherein the instructions to execute, utilizing the communication channel, the secure multiparty computation protocol between the first computing device and the second computing device comprises instructions to execute a random vector oblivious linear evaluation protocol between the first computing device and the second computing device.

6. The non-transitory computer readable storage mediums of claim 2, wherein the instructions to execute, utilizing the communication channel, the secure multiparty computation protocol between the first computing device and the second computing device comprises instructions to execute a vector oblivious linear evaluation protocol between the first computing device and the second computing device.

7. The non-transitory computer readable storage mediums of claim 2, wherein the instructions to execute, utilizing the communication channel, the secure multiparty computation protocol between the first computing device and the second computing device comprises instructions to execute a random vector oblivious linear evaluation protocol between the first computing device and the second computing device.

8. The non-transitory computer readable storage mediums of claim 3, wherein the instructions to execute, utilizing the communication channel, the secure multiparty computation protocol between the first computing device and the second computing device comprises instructions to execute a vector oblivious linear evaluation protocol between the first computing device and the second computing device.

9. The non-transitory computer readable storage mediums of claim 3, wherein the instructions to execute, utilizing the communication channel, the secure multiparty computation protocol between the first computing device and the second computing device comprises instructions to execute a random vector oblivious linear evaluation protocol between the first computing device and the second computing device.

10. The non-transitory computer readable storage mediums of claim 1, wherein the first selected instruction set comprises instructions to authenticate a network transaction in response to the polynomial relations satisfied state and instructions to reject the network transaction in response to the polynomial relations unsatisfied state.

11. The non-transitory computer readable storage mediums of claim 2, wherein the first selected instruction set comprises instructions to authenticate a network transaction in response to the polynomial relations satisfied state and instructions to reject the network transaction in response to the polynomial relations unsatisfied state.

12. The non-transitory computer readable storage mediums of claim 3, wherein the first selected instruction set comprises instructions to authenticate a network transaction in response to the polynomial relations satisfied state and instructions to reject the network transaction in response to the polynomial relations unsatisfied state.

13. The non-transitory computer readable storage mediums of claim 4, wherein the first selected instruction set comprises instructions to authenticate a network transaction in response to the polynomial relations satisfied state and instructions to reject the network transaction in response to the polynomial relations unsatisfied state.

14. The non-transitory computer readable storage mediums of claim 5, wherein the first selected instruction set comprises instructions to authenticate a network transaction in response to the polynomial relations satisfied state and instructions to reject the network transaction in response to the polynomial relations unsatisfied state.

15. The non-transitory computer readable storage mediums of claim 6, wherein the first selected instruction set comprises instructions to authenticate a network transaction in response to the polynomial relations satisfied state and instructions to reject the network transaction in response to the polynomial relations unsatisfied state.

16. The non-transitory computer readable storage mediums of claim 7, wherein the first selected instruction set comprises instructions to authenticate a network transaction in response to the polynomial relations satisfied state and instructions to reject the network transaction in response to the polynomial relations unsatisfied state.

17. The non-transitory computer readable storage mediums of claim 8, wherein the first selected instruction set comprises instructions to authenticate a network transaction in response to the polynomial relations satisfied state and instructions to reject the network transaction in response to the polynomial relations unsatisfied state.

18. The non-transitory computer readable storage mediums of claim 9, wherein the first selected instruction set comprises instructions to authenticate a network transaction in response to the polynomial relations satisfied state and instructions to reject the network transaction in response to the polynomial relations unsatisfied state.

* * * * *